United States Patent Office 3,539,866
Patented Nov. 10, 1970

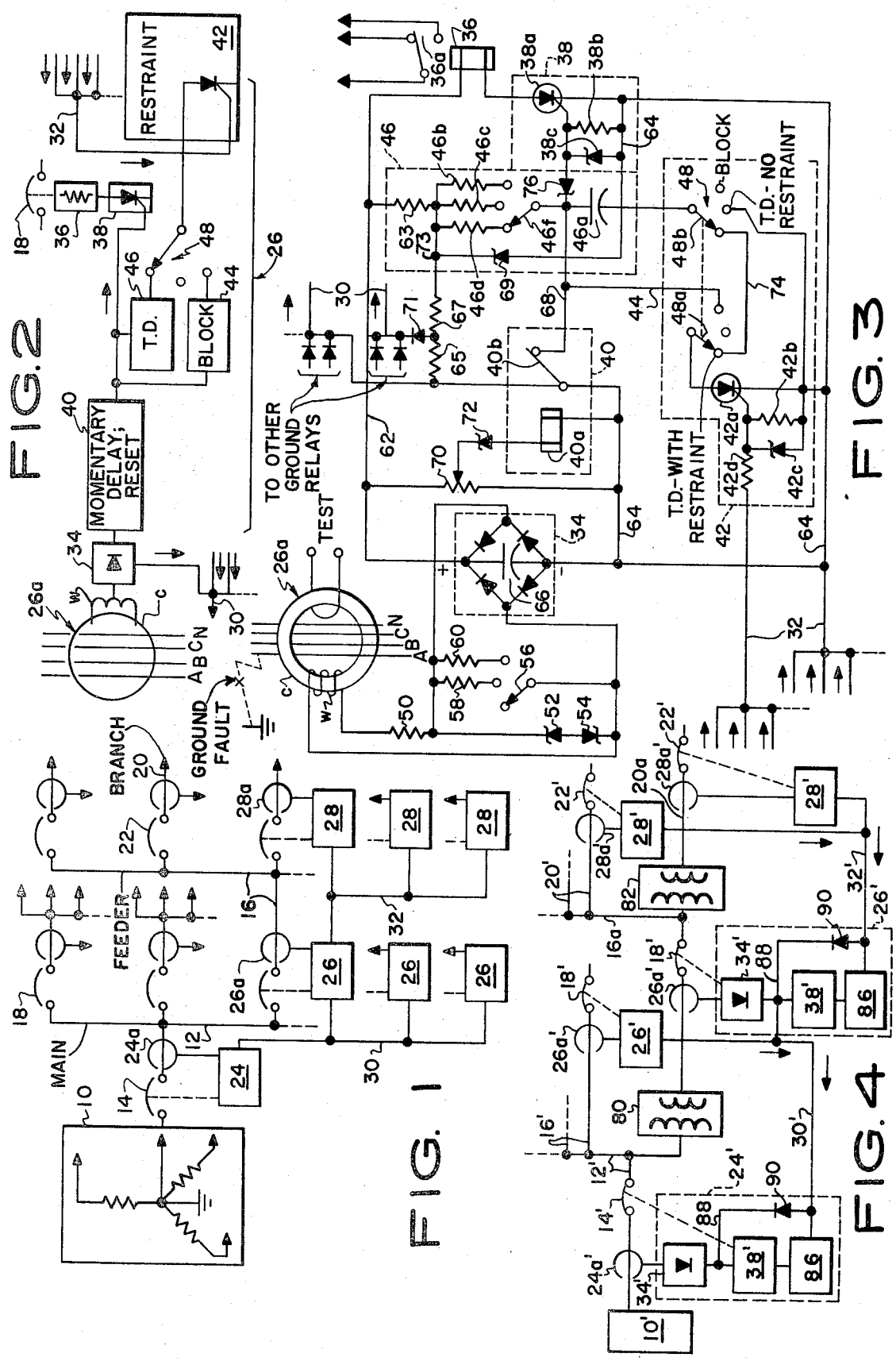

3,539,866
MULTI-ZONE FAULT PROTECTION SYSTEMS
Robert A. Stevenson, Toronto, Ontario, Canada, assignor to Federal Pacific Electric Company, a corporation of Delaware
Filed Oct. 11, 1967, Ser. No. 674,606
Int. Cl. H02h 3/28, 7/26
U.S. Cl. 317—18                                    23 Claims

ABSTRACT OF THE DISCLOSURE

A multi-zone ground fault protective system is described that includes main, feeder and branch circuit breakers or other forms of fault-responsive interrupters. Each circuit breaker has its own ground-fault tripper which may be instantaneous or it may have its own time delay, in responding to a fault in its immediate zone. In case a fault occurs in a downstream zone of a system, operation of the upstream circuit breakers is inhibited during a zone-coordination delay to allow time for the downstream breaker of the faulted zone to operate and clear the fault in its zone. If the downstream breaker should fail to clear the fault within the allotted time, the ground-fault control of the next-upstream breaker functions. If the ground fault occurs within the zone of an upstream circuit breaker (above a next-downstream circuit breaker), the upstream breaker responds immediately or with its own time delay, but without the zone-coordination time delay.

---

The present invention relates to multi-zone secondary electric power distribution systems and in particular to coordinated protection apparatus for such systems. In the discussion that follows special emphasis is placed on the application of the novel protective systems to ground faults but it will be recognized that the broader aspects of the invention apply also to multi-zone protective apparatus having fault-current detectors not necessarily identified with ground faults.

Severe damage is occasionally caused to the physical apparatus forming part of an electrical distribution system by a phase-to-ground arc, such as an arc in a switchboard or at a bus bar. Such an arc may involve relatively low levels of current compared with the overload setting of a circuit breaker or the rating of a fuse, and yet the damage caused by a persistent arc-to-ground can be extensive.

Ground fault detectors are often used to sense ground faults and to cause opening of a circuit breaker or other circuit interrupter in response to a ground fault even where the level of fault current is well below the overload setting of the circuit breaker at that part of the system. A difficulty resulting from such ground fault tripping arrangements is that, in a multi-zone distribution system such as one having main, feeder and branch busses, the same ground fault current may exist at each ground fault detector in the system. In case of a fault in a branch circuit the ground fault current could be high enough to cause tripping of the feeder circuit interrupter and the main circuit interrupter. It has been proposed to avoid such a consequence by setting the response level of the ground fault tripping device of the feeder interrupter at a current level substantially higher than that of a branch interrupter and to set the fault current level of the main circuit interrupter at a still higher level. See a paper entitled "Total Protection Against Harmful Over-Currents on Low Voltage Systems" by A. J. Goodwin and R. A. Stevenson delivered and distributed at the IEEE Winter Power Meeting, New York, N.Y., on Jan. 29–Feb. 3, 1967.

A difficulty of the foregoing proposal is that all three interrupters, branch, feeder and main, could respond simultaneously in the event of a ground fault severe enough to trip the main circuit interrupter, where the fault occurred in a branch circuit. Time grading has been proposed as an alternative. By incorporating a time delay device in the ground fault control of a feeder interrupter, its response to a ground fault can be delayed for a time interval that is made long enough to insure clearing of the fault at the branch circuit level and then, if the branch interrupter should fail to operate or if it should fail to clear the fault, the feeder interrupter would respond to its own ground fault detector. By like token, the ground fault control of the main circuit interrupter in a time-graded multi-zone system would be delayed still longer so that, in case both a branch interrupter and a feeder interrupter should fail to clear a branch circuit ground fault within the expected times of operation of both of those interrupters, then the main interrupter would respond to its own ground fault detector. Here again there is a difficulty, in that the feeder interrupter must necessarily delay its response to a ground fault even though the fault may be on the feeder bus, due to the built-in time delay in its own control. A still greater time delay would be involved in preventing operation of the main circuit interrupter in response to a fault on the main bus. During such delay times, a ground fault at the feeder level of the system or at the main bus of the system could cause enormous damage.

An object of the present invention is to provide a multi-zone secondary distribution system with coordinated protection apparatus for enabling circuit interrupters at each zone of the system to respond promptly to a fault in its zone and to provide the control device of an interrupter in the related upstream zone with a selectively operable time delay device that comes into operation only upon occurrence of a fault in a downstream zone. In this way each circuit interrupter is free to respond with ideal speed to a fault occurring in its own zone, and each upstream interrupter is also caused to respond to a fault in a downstream zone only after a suitable delay, to allow time for the downstream interrupter to clear the fault. A particular aspect of the invention is especially applicable to a secondary electric power distribution system in which the zones are conductively interconnected, that is, without a stepdown or isolating transformer between each zone and the next. In a conductively interconnected multi-zone system, the same ground fault current flowing in a downstream zone also flows in the upstream zone or zones. Consequently a ground fault in any zone produces a response in its own fault current detector and a response in the fault current detectors in each zone upstream of the fault. The particular coordination described below for meeting this condition is to use a downstream signal to delay the response of an upstream interrupter to its own associated fault current detector.

It will be understood that the foregoing coordinated protection system does not interfere with other characteristics that may be considered desirable in the control means of any given interrupter. For example, each control that is designed for response to a ground fault signal may have a brief delay in its own operation, for avoiding nuisance tripping that might otherwise result from severe transients such as transients arising from switching of momentarily asymmetric loads, and for allowing a limited time for the fault to clear itself.

A further object of the invention resides in providing a novel coordinated ground fault protection system in a multi-zone secondary electric power distribution system having a minimum of coordinating interconnections between the controls of the various zones.

An illustrative secondary electric power distribution system is shown in the accompanying drawings and discussed in detail below, equipped with ground fault relays in each zone, this system including main, feeder and branch zones. Ordinarily there are multiple feeders supplied by one main bus and each feeder supplies multiple branch circuits. The main zone has a main interrupter and a ground-fault detector, a control device responsive to the ground fault detector and a circuit interrupter that will open under control of the control device. Likewise, each feeder and each branch circuit has its own ground fault detector, control device and interrupter. In each case the interrupter is arranged to respond promptly, or with a prescribed delay if preferred, to a ground fault occurring in its zone.

The main and the feeders and the branch circuits are conductively connected in a system to which the invention is especially applicable. Accordingly, when a fault occurs on a branch circuit bus, the same fault current appears in the feeder and in the main bus. Each ground fault detector tends to respond. A time delay device inhibits the operation of the feeder interrupter for a limited period of time after appearance of a fault on a branch circuit. By like token a time delay device that responds to a fault signal in the feeder inhibits operation of the main interrupter for a limited period of time, after which the main interrupter is free to respond to its own fault current detector. In this way, even though there is no signal connection from a branch circuit fault detector to the main interrupter control, there is nevertheless a coordination from the branch circuit. This coordination delays the operation of the main breaker in response to the fault current flowing in the branch, feeder and main. The main interrupter would then operate, but only in case the branch and feeder interrupters should fail to clear the fault. The fault current in all the busses disappears as soon as the downstream circuit interrupter clears the fault. The signal from the fault current detector of the main interrupter ceases, and the main circuit interrupter stays closed.

In their broader aspects, certain features of the invention apply also to multi-zone systems having provision for coordinated ground-fault tripping in which transformers may be interposed between one zone and the next. Such a transformer isolates the ground fault current in the zone at the downstream or secondary side of the transformer from the zone at the primary side of the transformer. Delayed tripping of the interrupter in an upstream zone is here achieved in response to a persistent ground fault in a downstream zone, but this does not impose a delay on the tripping of the upstream interrupter in response to a ground fault occurring in its own zone.

Certain features of the invention relate particularly to self-powered relays in which the control signal for the relay is provided by a ground fault detector but where, in addition, the operating energy for the entire ground fault relay is provided by the ground fault detector.

The nature of the invention and further objects and novel features will be better appreciated from the following detailed description of a preferred embodiment and certain variations which are shown in the accompanying drawings that form part of the disclosure of this invention.

In the drawings:

FIG. 1 is a diagram of a power distribution system incorporating the novel ground protection systems;

FIG. 2 is a block diagram of a novel ground-relay typical of those in FIG. 1;

FIG. 3 is a wiring diagram showing details of a novel ground relay for the apparatus of FIGS. 1 and 2; and FIG. 4 is a diagram of a modified distribution system similar to that in FIG. 1, incorporating modified ground protection means.

In FIG. 1, a source 10 of three-phase power is shown connected by a main bus 12 through a main interrupter 14 to multiple feeders 16 each of which has its own feeder interrupter 18. In FIG. 1, three feeders and feeder interrupters are shown, any number being included as needed. Each feeder 16 is conductively connected to multiple branch circuits 20 each having its own branch interrupter 22. Each line 12, 14 and 16 and each interrupter 14, 18, 22 should be understood to represent the three phases or three phases and a neutral for three-phase power distribution, and a three-phase interrupter, where three-phase power is involved.

The circuit interrupters illustrated may be true circuit breakers in the sense that they are capable of interrupting short-circuit currents and are equipped with their own overcurrent tripping devices. Alternatively, they may be some form of switch that is equipped with a control that effects opening in response to a tripping signal. As one example of such devices, a contactor may be used which conventionally has a solenoid for holding the contacts closed and a relay with normally closed contacts in series with the solenoid. When such a relay is energized by a control signal, the solenoid is deenergized and the contactor opens. As another example, a switch may be used equipped conventionally with a stored-energy opening mechanism controlled by a solenoid-activated latch or shunt trip. When the latch solenoid is energized, the switch opens. These are examples of suitable interrupters of well-known design that may be used, each in an appropriate application. Where a contactor or a switch is used, it may be equipped with some form of overload-protection tripping means, provided that it has sufficient interruption capacity. Short-circuit protection would be provided separately, as by fuses. To the extent that the present system relates to ground fault protection, the interrupters employed may be those normally provided for overload and short-circuit protection in the distribution system, or separate circuit interrupters may be used solely for ground-fault protection together with fuses or other overload protection means.

Source 10 has a grounded neutral. In case a fault-to-ground should occur anywhere in the system an extremely destructive arc could develop. An enormous amount of energy could be present in the arc, and the current might nevertheless be below the level needed for prompt tripping of the overload protection apparatus ordinarily present in the system. Ground-fault current sensing means is provided at each zone in the system where a circuit interrupter is located, for tripping that interrupter in the event that a ground fault should develop in its zone. Thus, main interrupter 14 is provided with a control unit 24 (here called a "ground relay") that responds to ground-fault signals from a related ground-fault detector 24a. The preferred form of ground-fault detector is a zero phase sequence current transformer having a common core about all of the three-phase conductors of main bus 12. Individual current-transformers for the several phases are also contemplated, to be interconnected in a conventional manner to yield a ground-fault signal. Ground-fault current may also be detected in another known manner, using a single current transformer about a conductor connecting the shield of a circuit to the neutral. Ground fault detector 24a represents these and other appropriate forms of ground fault detectors. Similarly, each feeder interrupter 18 has associated therewith a ground relay 26, including its related ground fault detector 26a; and each branch circuit interrupter 22 has a ground relay 28 and its related ground-fault detector 28a.

It has been considered desirable to discriminate according to time, or current or both, in determining which interrupter of a system is to respond to a ground fault. When a fault occurs in a branch circuit, it would be a serious matter if the main interrupter were to open. There is danger of just such an occurrence in the illustrative distribution system of FIG. 1 in which the main, feeder and branch circuits are conductively connected and in which the main and feeder carry the ground fault current in a faulted branch circuit. To avoid this, the ground relay of a branch interrupter has been made responsive to a lower fault current than the ground relay of the feeder interrupter, or faster acting, or both. If the branch interrupter responds first, the faulted circuit is cleared and the ground relay of the branch interrupter no longer senses a ground fault. However, if the fault-current level is high enough, both the branch interrupter and the main interrupter would respond, in arrangements depending on different levels of fault current in the different zones. In the case of time zoning, there is an enforced time delay in the feeder ground relay and a longer delay in the main ground relay, so that a ground fault occurring in a feeder or in the main bus could not be cleared and would continue to cause more and more damage until the elapse of the particular built-in time delay.

To avoid these disadvantages, each of the relays 24, 26 and 28 is designed for so-called instantaneous trip; and the system includes a control signal path from each downstream relay to cause delayed operation in the next upstream relay but only in case of a downstream ground fault. Here the control is a restraining signal. Restraining-signal line 30 provides a signal from any one or more of the feeder ground-fault relays 26 to the main ground-fault relay 24; and restraining signal line 32 from branch ground-fault relays 28 to the related feeder ground-fault relay provides delaying restraint for the latter when there is a ground fault in any branch circuit. In case a ground fault should develop in a branch circuit the associated ground fault detector not only provides an activating signal in its own relay, but transmits the ground-fault signal via the coordinating signal channel to delay operation of the next ground relay upstream in the system.

A number of results occur from this relationship.

First, the occurrence of a fault in a branch circuit not only provides a tripping or releasing signal to cause the branch interrupter to open, but it also provides a restraining signal for the ground relay of the feeder interrupter (which is the interrupter next-upstream in the system). Consequently, the feeder interrupter is not released despite the flow of the same ground-fault current through its ground-fault detector in the conductively interconnected multi-zone distribution system of FIG. 1.

Second, while there is no restraining connection in the system of FIG. 1 from the ground fault relay of the branch interrupter to the ground fault relay of the main interrupter, and the ground-fault sensing device of the main interrupter responds to the ground-fault current of the branch-circuit fault, nevertheless the main ground-fault relay is restrained. This is because the feeder ground-fault relay produces a restraining signal for the main ground-fault relay, the relay that is next-upstream in the system. The feeder ground-fault relay is itself restrained from producing a tripping operation, but that restraint does not interfere with its providing a restraining signal for the upstream ground relay.

The system of this form involves only a single signal channel from the signalling parts of any group of downstream ground relays to the control or restraining portion of an upstream ground relay; and no direct restraining circuit is needed between a downstream ground relay and the ground relays at the second step upstream (and higher) in the system.

The coordination imposed by a downstream relay, e.g., a branch ground-fault relay, on the next-upstream relay, e.g., a feeder ground-fault relay, has no effect on other ground relays at its own level in the distribution system, e.g., other branch ground relays. Ground faults occurring in each of several branch circuits will act separately to activate their own related ground relays.

In a practical form of ground relay, the restraint may result in either of two types of system operation. The restraint may involve sustained blocking of all upstream ground relays, so long as a fault persists in a downstream zone if such is the selected mode of operation of the ground relays. However in a distinctive mode of operation, an upstream interrupter will not be permitted to respond to a sustained ground-fault current in its related ground-fault detector, but this restraint lasts for a time interval long enough to allow the next-downstream interrupter to function. Failure of a downstream interrupter means that the fault current in a branch circuit persists beyond the restraining time setting of a feeder ground relay whereupon the feeder interrupter will be released to respond to its ground-fault detector. In the event that both a branch interrupter and the related feeder interrupter should fail to clear a ground fault, then the main ground relay will become responsive to its own ground-fault detector for releasing the main interrupter. This takes place after elapse of the delay time interval of the main control unit, a longer interval than the delay time of the feeder control unit.

In FIG. 2 there is shown a block diagram of a ground relay representing any of ground relays 24, 26 and 28 of FIG. 1. Ground relay 26 is typical of such control units. Ground relay 26 includes a ground fault detector 26a that is represented in FIG. 2 as a zero phase sequence current transformer having a single core c to encircle all the power conductors A, B, C and N of a three-phase four-wire distribution circuit, plus a secondary winding w. The output of the current transformer is rectified in unit 34, and the direct current (which may be unidirectional half-waves) produces several effects. It provides the energy for operating the release coil 36 of the interrupter 18, acting through a switching unit 38. The direct-current ground-fault signal also operates a momentary delay device 40 that controls the transmission of the ground-fault signal to switching unit 38 for energizing coil 36. Still further, the ground-fault signal energizes restraint device 42, as will be understood from the discussion below of FIG. 3. The latter can be selectively set to be (a) disconnected from switching device 38, or (b) solidly connected to switching device 38 via a blocking connection 44, or (c) connected via a delay timer 46 to switching unit 38, depending on the manual setting of switch 48. Delay timer 46 responds instantaneously to the signal from restraint unit 42 by rendering the local control means ineffective to operate the local interrupter, but only for a prescribed delay interval. Momentary delay unit 40 should be somewhat slower-acting than restraint unit 42, so that, even if a control signal is provided by unit 40 for activating switching unit 38, the latter will respond only in the absence of an overriding effect of restraint unit 42.

A still further effect of ground-fault signal output from rectifier 34 is to transmit a restraining signal via its control line, e.g., line 30, to the ground relay that is next upstream in the system. This restraining signal will be transmitted so long as there is ground-fault current from the ground-fault detector 26a, e.g., zero phase sequence transformer c, w and irrespective of whether or not the ground relay of FIG. 2 is, itself, restrained. However, the effect of the restraining signal on the next-upstream ground relay endures only from the instant that the restraining signal appears and only for a limited time interval. Following that time interval, the upstream circuit interrupter becomes free to respond to its own fault detector.

Restraint unit 42 includes a control connection for receiving signals from a downstream ground relay via a control signal channel, e.g., channel 32. In the example given, restraint unit 42 depends for operation on there being both control output from restraining channel 32 and an energizing input from ground-fault detector 26a. Restraint unit 42 responds to the presence of a ground-fault signal from any one of the downstream ground relays, but also requires input from the ground fault detector c, w in FIG. 2. It is an advantage to utilize the energy from ground fault detector c, w for providing the electrical energy for operating unit 26, as a function additional to the essential function of providing a signal indicating the presence of a ground fault. The feature of operating a control unit by means of energy picked up by zero phase sequence current transformer c, w makes possible the construction of each ground relay as a self-contained unit without concern for providing an operating power supply. If this feature were not desired if the level of electrical energy available from any zero phase sequence transformer c, w in the different zones of the system (or any other form of ground fault detector) should be inadequate to provide operating electrical energy, then a separate source of power (not shown) would be provided for operating the ground relay. The ground fault detector would then function only for providing a ground fault signal to control relay 36, and to restrain upstream ground relays.

An important purpose of unit 40 is to provide a momentary delay to guarantee time for restraint unit 42 to become effective for restraining switching device 38 before a signal from the ground fault detector c, w (e.g., detector 24a, 26a, 28a in FIG. 1) can cause an interrupter-releasing operation of elements 38 and 36. However, unit 40 has an aditional function, that of restoring timing device 46 to its initial state in the event that a timing interval is started in response to a ground fault that proves to be only momentary. This is discussed below in greater detail. It is clear from the foregoing that gate or solid state switching unit 38 responds to control by both the signal obtained from the local ground fault detector 26a and from the downstream detectors which provide their signal on line 32. The character of control in this embodiment is that switching device 38 will respond to a signal from ground fault detector 26a promptly (or after a slight delay imposed by unit 40) except that the response to the local ground fault signal can be restrained in the event of a signal appearing on downstream control line 32. As an alternative, almost as an alternative point of view or circuit logic, it may be considered that the restraining device is interposed between momentary delay unit 40 and gating device 38, the restraining device normally being by-passed but being called into effect in the event of a signal appearing on line 32. In this discussion the restraint is one of time delay or of sustained blocking so long as a downstream signal appears on line 32, whichever may be preferred.

Turning now to FIG. 3 a particular embodiment is illustrated of a ground relay incorporating features of the invention, the same numerals being used in FIG. 3 as those found in FIGS. 1 and 2 wherever possible. Accordingly, zero phase sequence transformer c, w is provided as a ground fault detector 26a. A resistor 50 is connected in series with a series-opposed pair of Zener diodes 52, 54 to provide clipped alternating current output at the input terminals of a bridge rectifier 34. A sensitivity selector switch 56 is included for connecting load resistors 58 and 60 selectively across the input leads to the bridge rectifier, to draw current and thus produce a drop in resistor 50 for reducing the sensitivity of the apparatus.

Rectified output appears on leads 62 and 64, and across these leads a smoothing capacitor 66 is provided in this example. It is understood that this capacitor may be omitted in case such a capacitor were to produce a retarding effect greater than that permissible in any give application. The rectified half-waves in the output of the bridge rectifier may be treated as direct current herein.

A series circuit may be traced from line 62 via resistor 63 and Zener diode 69 to line 64. In parallel with Zener diode 69 there is a voltage divider consisting of series-connected resistors 65 and 67. The positive terminal 73 of Zener diode 69 (remote from line 64) provides a voltage-limited terminal for this voltage divider. One of the pair of wires comprising fault-current signal channel 30 is connected via isolating diode 71 to the junction of these resistors. Line 64 constitutes the other wire of this signal channel 30. Appearance of the required level of signal fault current at the output of rectifier 34 will provide restraining output on line 30 for the next upstream ground relay (FIG. 1). The signal voltage rise on line 30 is limited by the break-over level of Zener diode 69, to a value established by the relative values of voltage-divider resistors 65 and 67.

Leads 62 and 64 also provide direct current energization for solid-state switching device 38 and relay 36. This relay includes single-pole double-throw contacts 36a including normally open contacts for connection to the shunt tripping coil of a circuit breaker, and normally closed contacts for connection in series with the holding coil of a contactor, or any other appropriate device for opening the contacts of an interrupter such as interrupter 18. Switching device 38 comprises an SCR 38a whose anode-cathode circuit is in series with the coil of relay 36. The gate-cathode circuit of the SCR has a resistor 38b and a voltage limiting Zener diode 38c.

Control for the gate SCR 38a is obtained from two sources: from momentary delay and reset unit 40, and from a restraining signal circuit.

Unit 40 here consists of a relay 40a having a pair of normally closed contacts 40b that connect a lead 68 to the negative direct current line 64 that extends to the cathode of SCR 38a. So long as relay 40a remains de-energized SCR 38a remains switched off and relay 36 remains de-energized. Input to relay 40a is obtained from potentiometer 70 across direct current leads 62, 64. A Zener diode 72 is connected in series with relay 40a to the adjustable tap of potentiometer 70.

Restraint unit 42 includes an SCR 42a whose cathode is connected to negative direct current lead 64 and whose anode is connected to section 48a of switch 48. The gate-cathode circuit of SCR 42a includes a resistor 42b and a Zener diode 42c in parallel; and a dropping resistor 42d is connected in series with the gate input signal lead.

Switch 48 has three positions in this illustrative embodiment. In a first position of switch 48, a circuit may be traced from SCR 42a via switch section 48a, lead 74, and switch section 48b to capacitor 46a of time delay unit 46. In this switch position, SCR 42a provides coordination of the ground relay of FIG. 3 with the downstream ground fault detectors. Three different delay time intervals may be chosen by connecting capacitor 46a via selector switch 46f to one of three resistors 46b, 46c and 46d. These resistors have a common positive connection to the voltage-limited terminal of Zener diode 69. The junction of capacitor 46a and switch 46f is connected to the gate circuit wire 68 of switching device 38.

In a second position of switch 48, switch section 48b connects capacitor 46a to negative direct-current line 64. In this position of switch 48, there is no coordination of the control unit in FIG. 3 with any downstream ground fault detectors. In the second position of switch 48 the control circuit in FIG. 3 responds only to ground fault detector 26a, and the response occurs after a delay time interval determined by the setting of delay unit 46.

With switch 48 set in the third position, coordinating SCR 42a is connected via switch section 48a and lead 44 directly to gate circuit wire 68 of switching device 38. In this setting of switch 48 the response of the control circuit in FIG. 3 to a fault-current signal from detector 26a is blocked or suppressed indefinitely so long as a signal from a downstream fault detector on line 32 is such as to maintain SCR 42a conductive.

The delay circuit 46 operates as follows, whether switch 48 is set in its first position or in its second position. It may be assumed that switch 48 is set in its second position or that switch 48 is set in its first position with SCR 42a conductive, and further than an ample ground fault signal is produced by ground fault detector 26a so that terminal 73 of diode 69 reaches its voltage-limited potential. Under these conditions, control wire 68 of gate 38 starts to rise in potential above negative DC wire 68 at a rate determined by the time constant of capacitor 46a and the resistance selected by switch 46f. Between wire 68 and the gate of SCR 38a there is a Zener diode 76. As soon as the potential across capacitor 46a rises so that Zener diode 76 breaks down, SCR 38a fires. Zener diode 38c protects the gate of SCR 38a from excessive voltage rise.

In the second setting of switch 48, restraint unit 42 is disabled so that there is no controlled coordination of the control circuit of FIG. 3 with any downstream zone. The interrupter controlled by the circuit of FIG. 3 is responsive solely to the local ground-fault detector 26a, and it is subject to a time delay determined by the setting of switch 46f.

In the first and third settings of switch 48 restraint unit 42 provides control coordination for the control unit of FIG. 3, in dependence on a downstream fault signal on signal channel 32.

The signal input to the gate of SCR 42a is derived from the signal channel 32 energized by ground-fault signal from the next downstream ground relays, or any one of them. By virtue of dropping resistor 42d and Zener diode 42c, the signal applied to SCR 42a does not reach a level destructive to SCR 42a; and this SCR will not operate at all unless its anode-to-cathode voltage reaches the necessary minimum of a few volts for firing, the exact value depending on the type of SCR used. With switch 48 at the second position, SCR 42a is disconnected and SCR 38a does not respond to a signal on line 32 from a downstream ground relay.

The first and third positions of switch 48 provide downstream coordination for the control circuit of FIG. 3. With switch 48 in the first position, SCR 38a does not fire so long as relay contacts 40b remain closed since, at this time, line 68 is maintained at the same potential as the SCR cathode. However, when contacts 40b open, the voltage of line 68 rises to a limiting value as determined by Zener diode 69. Capacitor 46a starts to charge, and when the breakdown level of Zener diode 76 is reached SCR 38a fires and relay 36 operates to open the interrupter controlled by the relay contacts.

With switch 48 in the third position, the delay circuit is disconnected and, instead, negative line 64 is connected via SCR 42a and line 44 to line 68. In this condition, opening of relay contact 40b does not change the condition of device 38a, so long as there is a sufficient downstream ground-fault signal on line 32 to fire SCR 42a.

In all the discussion of the action of restraint unit 42 it will be recognized that this unit has no effect on line 68 until after relay contacts 40b open. If there is a downstream fault and correspondingly if there is a signal appearing on line 32, that condition develops virtually at the same time as the signal output from ground fault detectors 24a, 26a, 28a. in FIG. 3. The ground fault signal developed between lines 62 and 64 energizes relay 40a (assuming sufficient signal strength) and contacts 40b open. Due to the inherent electromechanical delay involved in the opening of those relay contacts, there is assurance provided that restraint unit 42 will be operative at the moment when contacts 40b actually part. Typically this delay amounts to a few milliseconds, whereas unit 42 responds instantly to a ground fault signal from any of the next-downstream relays. Since this is only a fraction of a cycle, response of SCR 38a to a signal from ground fault detector 26a is called instantaneous and this action occurs in the absence of a downstream ground fault signal fault signal on line 32.

Unit 40 has still another function, which comes into operation when switch 48 (FIG. 3) is in one of its time delay settings. In case there should be a momentary ground fault, detected both in the ground fault detector of FIG. 3 and in a downstream ground fault detector resulting in a signal on line 32, the resulting ground fault signal might be momentary. This could occur in the case of a momentary transient condition. More important, however, there could be a downstream ground fault and that fault could be cleared by response of the downstream interrupter to its ground relays. The signal would accordingly disappear from direct current line 62, 64 so that relay 40a would be de-energized and contacts 40b would reclose. Contacts 40b would then complete a circuit for discharging the partly charged capacitor 46a through SCR 42a, thus leaving the time delay unit in condition to start a timing operation at the instant that an ensuing ground fault should occur. There is accordingly no danger of response of relay 36 to a downstream fault that is cleared or to a spurious signal because of failure of the time delay circuit to be restored to initial condition.

The circuit shown in FIG. 3 may be used at each of the places in FIG. 1 where a ground relay is needed. In the case of a ground relay located at the branch interrupter part of the system, switch 48 could be set in the position shown if there is to be no restraint on the operation of such a ground relay, or it could be set at the second position if a delay interval is wanted. It would respond to a branch-circuit ground fault instantly or with a chosen time delay. With ground relays in the form of FIG. 3 installed as the feeder ground relays 26 or as the main ground relay 24, then the switch 48 would be set in coordinated time delay setting (the first position of switch 48 as shown) assuming that form of operation is wanted; or it could be set in the "block" position. A ground relay of the form in FIG. 3 installed as a ground relay 28 for monitoring a branch circuit would provide an upstream restraining signal to ground relay 26 on line 32. However, the same ground fault current in the feeder would produce in relay 26 a restraining signal for the upstream ground relay 24. The ground relay 26 would normally operate after a time delay sufficient to allow the normal operation of branch-circuit interrupters 22, but failure of those interrupters to clear the faulted downstream circuit would bring into operation the feeder relay to trip the related feeder interrupter 18 with switch 48 set as shown. The upstream ground relay 24 would have its time delay circuit set for a longer time interval than that of ground relays 26 so as to allow for the related feeder interrupter 18 to clear the circuit following the delay of the feeder ground relay to allow time for operation of the branch-circuit interrupter. Main interrupter 14 would stay closed for a period long enough to allow both the branch-interrupter and the feeder interrupter to operate for clearing the faulted circuit.

In this system, if the ground fault should appear in the feeder circuit rather than in a branch circuit, then there would be no ground fault signal on line 32. Each feeder ground relay 26 would be in condition for nominally instantaneous operation. By like token, if the ground fault were to develop in the main circuit 12, the ground relay 24 would be in condition to respond without delay since there would be no restraining signal on line 30. If desired, relay 40a can have its own built-in retarding means, for suppressing response to switching transients and other signals that spuriously represents ground faults for a brief time interval.

In the distribution system of FIG. 1 the main bus, the feeder and the branch circuits are all conductively interconnected, there being no transformers in the system.

As a result, the ground fault current appearing in any one or more of the branch circuits appears also in the upstream feeder, and in the main bus as well. This creates a problem of discriminating, in the feeder zone and in the main zone, against ground faults in the branch circuits, a downstream zone; and likewise there is a problem of discriminating in the main zone against ground faults occurring at a feeder. The system of coordination which has been described in connection with FIGS. 1–3 actually takes advantage of the ground fault current due to a fault at branch-circuit being present in the feeder and in the main bus, but discrimination is provided by the coordinating circuits in the feeder zone and in the main bus zone. Each ground relay obtains a control signal from the zone that is next-downstream in relation to it.

FIG. 4 shows a distribution system closely resembling that of FIG. 1. Parts in FIG. 4 bear primed numerals corresponding to the numerals appearing in FIG. 1, to corresponding parts. A three-phase power supply 10' is connected to main bus 12' through main interrupter 14'. Several feeder busses 16' are energized by main bus 12', each feeder including its own interrupter 18'. A particular feeder 16a is supplied by main bus 12' via stepdown transformer 80. Feeder 16a is connected conductively to multiple branch circuits 20', and feeder 16a is connected to a particular branch circuit 20a via transformer 82. As in FIG. 1 each branch-circuit interrupter 22' has a control unit 28' that is supplied with fault-current signals by zero phase sequence transformer 28a'. An output signal is provided by each control unit 28' on coordinating line 32' extending ot control unit 26' of the related feeder. Similarly each control unit 26' has a ground-fault input current connection to a zero phase sequence transformer 26a'. Output connections from control units 26' extend via coordinating line 30' to control unit 24' of the main bus. The latter has its input connection to zero phase sequence transformer 24a' on the main bus.

The operation of the system in FIG. 4 is the same as that of FIG. 1, for all of those parts of the system including the main bus, the feeders and the branch circuits that are conductively interconnected. However, a different mode of operation is necessary where a transformer is interposed between the ground-fault detector in one zone and the ground fault detector in another zone. For example, transformer 80 may be a step-down transformer between a main bus operating at 600 volts and feeder 16a that operates at 440 volts. Ground fault detectors 24a' and 26a' are separated by transformer 80 so that a ground fault current appearing on feeder 16a would not appear in main bus 12'. The same mode of operation is achieved here as that in FIG. 1, despite the inclusion of a stepdown transformer, through the use of modified control units. Thus, control unit 24' includes a restraint-and-delay unit 86 that is energized by a direct current signal on line 30' and the output of delay unit 86 is applied to a gate 38'. Zero phase sequence transformer 24a' has an operating connection through rectifier 34' corresponding to rectifier 34 in FIG. 3. Up to this point, control unit 24' is basically the same as control unit 24' in FIGS. 1–3. However, a line 88 including a blocking diode 90 couples the direct-current signal on line 30' to the input connection of gate 38'.

The operation of the main and feeder portions 12' and 16a of FIG. 4 will now be described. In the event of a ground fault appearing on bus 12' but not downstream, signal from zero phase sequence transformer 24a' will activate control unit 24' in the manner described in connection with FIG. 1, to cause interrupter 14' to open the circuit. This operation occurs either instantly or after an assigned delay interval as may be desired. In the event of a ground fault occurring on feeder 16a, control unit 26' will operate the same as control unit 24' to cause feeder interrupter 18' to open the feeder circuit, in response to ground fault current detected by zero phase sequence transformer 26a'. Control unit 26' provides direct current output from rectifier 34' not only to the input of delay unit 86 in control unit 24' but also supplies an input signal on line 88 via rectifier 90 to activate gate 38'. At the end of the delay time interval of delay unit 86, the signal on line 88 causes gate 38' to effect opening of interrupter 14', just as if there had been a ground fault signal on main bus 12'. Rectifier 90, a diode, prevents a ground fault signal from zero phase sequence transformer 24a' on the main bus from affecting the downstream control units in the distribution system.

Line 30' obtains a control signal for the delay portion 86 of ground relay or control unit 24' from other feeder ground relays 26'. Consequently gate 38' has an input signal from zero phase sequence transformer 24a' and from connection 88 whenever there is a ground fault on a bus 16' that is conductively connected to a main bus 12'. This connection has no effect on the operation of ground relay or control unit 24' which operates just as described previously in connection with a ground fault on feeder 16a (FIG. 4) or a ground fault on the feeder 16 in FIG. 1.

Control unit 26' is the same in all respects as control unit 24'. It derives an input signal from its zero phase sequence transformer 26a' on feeder 16a, and it derives a signal from a downstream branch-circuit control unit 28' on line 32', both for initiating operation of the delay portion of control unit 26' and for providing an operating signal for that control unit in the event of failure of interrupter 22' to clear the branch-circuit ground fault. In other words transformer 82 prevents a ground fault signal on branch circuit 20a from appearing on feeder 16a, but control unit 26' is not dependent on a ground fault signal from zero phase sequence transformer 26a' in order to clear a persistent ground fault on the downstream branch circuit 20a.

While several embodiments of the invention have been shown and described in detail it will be apparent to those skilled in the art that various changes and modifications may be made herein without departing from the spirit and scope of the invention.

I claim:

1. A secondary electric power distribution system including a first bus connected to a source of power, a first circuit interrupter interposed in said first bus, a first fault current detector for said first bus, first control means normally responsive to said first fault current detector for causing said first circuit interrupter to open, plural second busses connected in parallel to said first bus downstream thereof wherein fault current in a said second bus is also carried by said first bus, a second current-responsive circuit interrupter in each of said second busses, a second fault current detector associated with each of said second busses respectively, and time delay means responsive to said second fault-current detectors individually and arranged to delay the action of said first control means in causing opening of said first interrupter until the end of a time interval slightly longer than the time required for a said second interrupter to clear a fault in its bus, whereby, in the event of failure of a second circuit interrupter to clear a fault on its second bus within the normal time interval, said first interrupter will be operative to interrupt said first bus, and whereby said first controls means is free to cause operation of said first circuit interrupter without delay of said time delay means in the event that a fault should occur on said first bus.

2. A secondary electric power distribution system in accordance with claim 1, further including a second control means for each said second circuit interrupter, said second control means being responsive to a related one of said second fault current detectors.

3. A secondary electric power distribution system in accordance with claim 1 wherein said first control means includes initial time delay means for delaying the response thereof to said first fault current detector only sufficiently to assure time for said time delay means to become effective.

4. A secondary electric power distribution system in accordance with claim 1, wherein said time delay means comprises a delay timer having a common input coupling to said second fault current detectors.

5. A secondary electric power distribution system in accordance with claim 1 including means responsive to the interruption of the fault current that initiated operation of the time delay means for resetting the same.

6. A secondary electric power distribution system in accordance with claim 20 wherein said first bus has conductive connections to said second busses and wherein each of said fault current detectors is a zero phase sequence current detector.

7. A secondary electric power distribution system in accordance with claim 2 wherein each of said first and second control means includes initial time delay means for delaying the response thereof to its related fault current detector, respectively.

8. A secondary electric power distribution system in accordance with claim 1 further including second control means for each of said second circuit interrupters responsive to a respective one of said second fault current detectors, a group of parallel-connected third busses connected to one of said second busses downstream thereof, a third circuit interrupter in each of said third busses, third fault current detectors for each of said third busses, and second time delay means responsive to said third fault current detectors individually and arranged to delay the action of the related one of said second control means in causing opening of the related second interrupter but only for a limited time interval during which a third downstream circuit interrupter should clear a fault on its bus but said second control means not being subjected to said delay in case of a fault only on its related second bus.

9. A secondary electric power distribution system in accordance with claim 8, wherein the delay time interval of said first time delay means is longer than that of said second time delay means for causing opening of said first circuit interrupter in response to its fault current detector only after a lapse of time sufficient for normal clearing of a fault in a third bus by the related third circuit interrupter and, should the latter fail, by the related second circuit interrupter.

10. A secondary electric power distribution system in accordance with claim 8 wherein said second time delay means is a common delay timer having a common input coupling to said third fault current detectors.

11. A secondary electric power distribution system in accordance with claim 8 wherein said first and second control means includes initial time delay means for delaying the response thereof to the related one of said first and second fault current detectors.

12. A secondary electric power distribution system in accordance with claim 8 including means responsive to the interruption of the fault current that initiated operation of each respective time delay means for resetting the same.

13. A secondary electric power distribution system in accordance with claim 8 wherein said first bus has conductive connections to said second busses and to said third busses and wherein each of said fault current detectors is a zero phase sequence current detector.

14. A secondary electric power distribution system in accordance with claim 8 wherein said first, second and third busses have conductive connections therebetween and wherein each of said fault current detectors is a zero phase sequence detector, and wherein the delay time interval of said first time delay means is longer than that of said second time delay means for causing opening of said first circuit interrupter in response to its fault current detector only after a lapse of time sufficient for normal clearing of a fault in a third bus by the related third circuit interrupter and, should the latter fail, by the related second circuit interrupter.

15. A secondary electric power distribution system in accordance with claim 1, wherein said time delay means is arranged to suppress operation of said first interrupter in response to its own fault current detector until after said time interval has elapsed.

16. A secondary electric power distribution system in accordance with claim 8 wherein said first-mentioned time delay means is arranged to suppress operation of said first interrupter in response to its own fault current detector until lapse of the time interval of said first-mentioned delay means and wherein said second time delay means is arranged to suppress operation of each said second circuit interrupter in response to its own fault current detector until after the time interval of said second time delay means.

17. A secondary electric power distribution system in accordance with claim 1 wherein said first fault current detector is arranged to provide the electrical energy for operating said first control means.

18. A secondary electric power distribution system in accordance with claim 2 wherein each fault current detector is arranged to provide the electrical energy for operating its respective control means.

19. A secondary electric power distribution system in accordance with claim 1 wherein said time delay means includes a resistance-and-capacitance timing circuit and voltage-limiting means for limiting the signal from a said second fault current detector to said timing circuit.

20. A secondary electric power distribution system including a first bus connected to a source of power, a first circuit interrupter interposed in said first bus, a first fault current detector for said first bus, first control means normally responsive to said first fault current detector for causing said first circuit interrupter to open, plural second busses energized by said first bus downstream thereof, a second current-responsive circuit interrupter in each of said second busses, a second fault current detector associated with each of said second busses respectively, and coordinating means responsive to said second fault-current detectors individually and including time delay means for causing opening of said first interrupter at the end of a time interval slightly longer than the time normally required for a said second interrupter to clear a fault in its bus in case such a fault should persist for said time interval, whereby, in the event of failure of a second circuit interrupter to clear a fault on its second bus within the normal time interval, said first interrupter will no longer be delayed from interrupting said first bus, and whereby said first control means is free to cause operation of said first circuit interrupter without the delay of said time delay means in the event that a fault should occur on said first bus and not on any of said second busses.

21. A secondary electric power distribution system in accordance with claim 20 wherein each of said second fault current detectors comprises a ground-fault sensing current transformer.

22. A secondary electric power distribution system in accordance with claim 20 wherein a transformer is interposed between said first bus and at least one of said second busses and wherein said coordinating means includes a fault current signalling path from each said second fault current detector to said first control means so that persistence of a fault in a second bus that is energized through a transformer is available for operating said first control means.

23. A secondary electric power distribution system in accordance with claim 20 further including second control means for each of said second circuit interrupters responsive to a respective one of said second fault current detectors, a group of third busses energized by at least one of said second busses downstream thereof, a transformer interposed between atleast one of said busses and said one of said second busses, a third interrupter in each of said third busses, third fault current detectors for each of said third busses, and second coordinating means responsive to said third fault current detectors individually and including second time delay means for causing opening of the interrupter of said one of said second busses at the end of a time interval slightly longer than the time normally required for a said third interrupter to clear a fault in its bus in case such a fault should persist for the time interval of said second time delay means, said coordinating means and said second coordinating means including a fault-current signalling path from the fault-current detector of said one of said third busses to the related second control means and to said first control means so that persistent fault currents in said one of said third busses is available to operate said one of said second control means and said first control means.

References Cited
UNITED STATES PATENTS

| | | | |
|---|---|---|---|
| 3,259,802 | 7/1966 | Steen | 317—18 |
| 3,315,129 | 4/1967 | Fisher | 317—18 |

JAMES D. TRAMMELL, Primary Examiner

U.S. Cl. X.R.

317—26, 28